United States Patent [19]

Vandiver

[11] Patent Number: 4,867,104

[45] Date of Patent: Sep. 19, 1989

[54] BIRD FEEDER WITH SQUIRREL GUARD

[76] Inventor: Lonnie E. Vandiver, 6528 Skyline Dr., Springfield, Mo. 65804

[21] Appl. No.: 197,292

[22] Filed: May 23, 1988

[51] Int. Cl.⁴ .............................................. A01K 39/00
[52] U.S. Cl. .................................. 119/57.9; 119/52.3
[58] Field of Search ...................... 119/51 R, 52 R, 63

[56] References Cited

U.S. PATENT DOCUMENTS

| | | | |
|---|---|---|---|
| 2,891,508 | 6/1959 | Bower | 119/51 R |
| 3,124,103 | 3/1964 | Stainbrook | 119/63 |
| 3,126,870 | 3/1964 | Matthew | 119/52 R |
| 3,590,780 | 7/1971 | Dunbar | 119/51 R |
| 4,031,856 | 6/1977 | Chester | 119/63 X |
| 4,207,839 | 6/1980 | Barry | 119/51 R |
| 4,323,035 | 4/1982 | Piltch | 119/51 R |

*Primary Examiner*—Gene Mancene
*Assistant Examiner*—R. Thomas Price
*Attorney, Agent, or Firm*—Kokjer, Kircher, Bradley, Wharton, Bowman & Johnson

[57] ABSTRACT

A bird feeder having a squirrel guard which prevents squirrels from reaching the bird seed held by the feeder. The squirrel guard is mounted on the base of the feeder and includes roller elements which extend completely around its perimeter. The roller elements are positioned so they must be gripped by the animals, and the elements then rotate to prevent or grip secure enough to allow the animal to climb past the squirrel guard onto the feeder. The guard can also be used by itself to protect posts and trees against climbing animals.

20 Claims, 1 Drawing Sheet

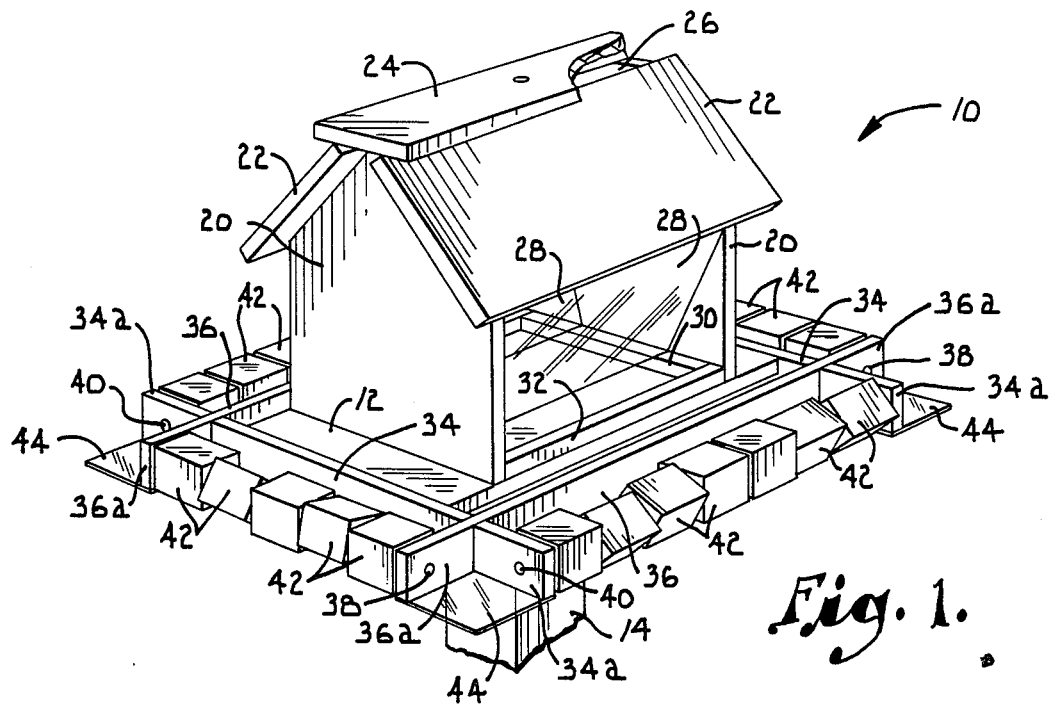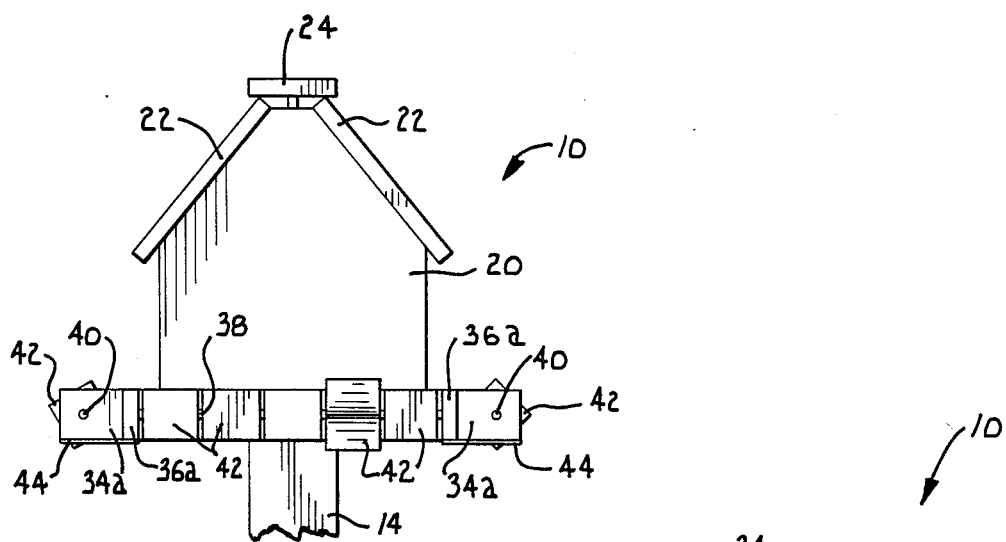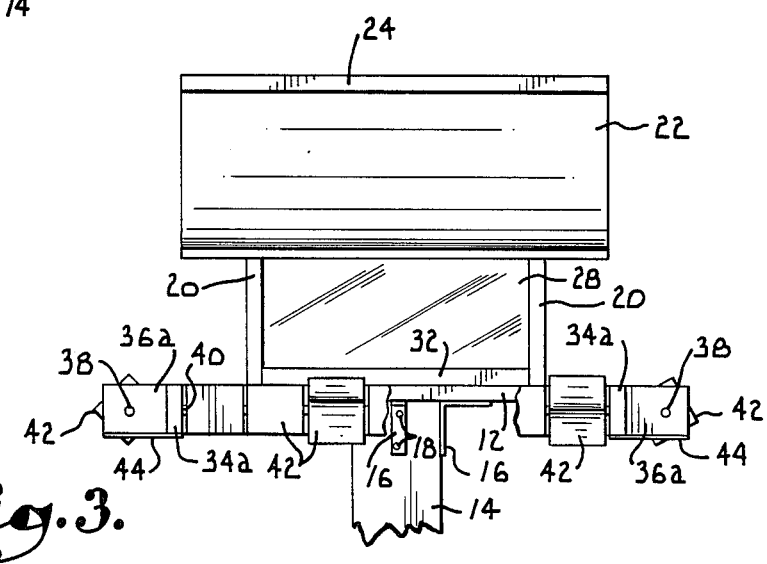

BIRD FEEDER WITH SQUIRREL GUARD

BACKGROUND AND SUMMARY OF THE INVENTION

This invention relates generally to bird feeders and more particularly to a bird feeder having a squirrel guard that thwarts squirrels and other climbing animals attempting to obtain access to the bird seed held by the feeder.

Bird feeders have long been plagued by squirrels and other small climbing animals. Squirrels in particular display remarkable abilities in obtaining access to the bird seed which is held by the feeder. Various devices have been proposed for denying squirrels access to bird feeders while still allowing birds to feed. Examples are disclosed in U.S. Pat. Nos. 4,541,362 to Dehls; 4,523,546 to Latham; 4,434,745 to Perkins et al.; 4,323,035 go Piltch; 3,126,870 to Matthew and 2,344,3667 to Pueschel.

The squirrel proofing arrangements shown in these patents are either largely ineffective against squirrels, unduly repulsive to birds, or so complicated and expensive as to be impractical. As a consequence, most bird feeders that are currently in use are unduly plagued by squirrels and other climbing animals, and it is clear that a need remains for a bird feeder that is constructed simply and yet in a manner to discourage squirrels without at the same time discouraging birds. It is a primary goal of the present invention to meet that need.

More specifically, it is an object of the invention to provide a squirrel guard that is constructed to prevent squirrels and other animals from climbing past it onto a bird feeder or other area which is intended to be off limits to climbing animals. Although the squirrel guard is especially well suited for use in combination with the bird feeder, it is also useful by itself to prevent raccoons, possums and other animals from climbing poles or trees.

In accordance with the invention, a squirrel guard is specially arranged so that it can be mounted on a tree, pole or other elevated position at which protection from squirrels is desired. The squirrel guard can be mounted on the base of a bird feeder or alone on a tree or post. In either case, the squirrel guard functions as a protective device that prevents squirrels from climbing past it.

The squirrel guard includes a plurality of roller elements which extend substantially continuously and completely around the bird feeder or other area that is to be protected. Consequently, a squirrel must climb past the roller elements in order to get above it onto the protected structure. The roller elements are mounted for rotation so that when gripped by the paw of a squirrel or animal, they turn and thus prevent the animal from obtaining a grip that is secure enough to permit it to climb past the squirrel guard.

When used with a bird feeder, the squirrel guard extends around the perimeter of the base of the feeder. The rollers may be virtually any desired shape and are mounted on four shafts arranged in a rectangular configuration. Transparent guard panels may be provided at the corner areas of the rectangle to prevent the animal from climbing past the squirrel guard at one of its corners.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view of a post mounted bird feeder equipped with a squirrel guard constructed according to a preferred embodiment of the present invention, with a portion broken away for purposes of illustration;

FIG. 2 is an end elevational view of the bird feeder and squirrel guard shown in FIG. 1; and FIG. 3 is a side elevational view of the bird feeder and squirrel guard, with a portion broken away for purposes of illustration.

Referring now to the drawing in more detail, numeral 10 generally designates a bird feeder which may be of virtually any desired construction. The bird feeder 10 illustrated in the drawing has its floor formed by a rectangular horizontal platform 12 which is mounted on top of a vertical post 14. As shown in FIG. 3, four L-shaped brackets 16 are used to secure the platform 12 on top of the post 14. Suitable fasteners 18 connect the bracket 16 with the post and with the underside of the platform 12.

The bird feeder 10 includes a pair of parallel opposite ends 20 which extend upwardly from platform 12. The feeder 10 has a peaked roof provided by a pair of inclined roof sections 22. The roof sections 22 are mounted on the inclined upper edges of the ends 20. A flat cover 24 is mounted on the peak of the roof in a manner permitting it to be rotated for the loading of seed. When the cover 24 is rotated 90° from the position shown, bird seed can be loaded into the feeder 10 through an opening 26 provided at the peak of the roof between the adjacent edges of the roof sections 22.

A pair of transparent panels 28 are mounted inside of the bird feeder 10. The panels 28 incline inwardly from top to bottom to funnel the bird seed toward the floor of the bird feeder. The lower edges of the panels 28 are spaced above platform 12 and rest on cleats 30 which are located adjacent to the opposite ends 20. Additional cleats 32 extend between the ends of cleats 30 adjacent the opposite sides of the bird feeder 10.

In accordance with the present invention, a squirrel guard is provided and extends around the bird feeder base which is provided by platform 12. The squirrel guard includes a pair of end slats 34 which are parallel to one another and a pair of side slats 36 which are parallel to one another and perpendicular to the end slats 34. Each slat is arranged on edge, and the four slats 34 and 36 are connected together to form a rigid rectangular frame Each end slat 34 is notched near its opposite ends, and the side slats 36 are similarly notched such that the notches in the slats 34 and 36 can be interfitted to connect the slats together. This arrangement provides each end slat 34 with a pair of projecting ends 34a and each side slat 36 with a pair of projecting ends 36a.

The squirrel guard includes a pair of horizontal shafts 38 which are located outwardly of and parallel to the end slats 34. Each shaft 38 extends between the spaced apart slat ends 36a on the opposite ends of the bird feeder. The two shafts 38 are parallel to one another. Another pair of horizontal shafts 40 are located on opposite sides of the bird feeder. The shafts 40 are located outwardly of and parallel to the side slats 36.

Each shaft 40 extends between the spaced apart slat ends 34a located on opposite sides of the bird feeder.

Mounted for rotation on each shaft 38 and 40 are a plurality of roller elements which may take the form of rectangular blocks 42. The blocks 42 are arranged side by side on each shaft 38 and 40 and extend continuously along the entire length of each shaft between the slat ends 34a and 36a. Each block 32 is freely rotatably on its shaft. The roller elements provided by blocks 42 thus extend substantially continuously and completely around the entire perimeter of the base of the bird feeder 10. It should be understood that the roller elements can be shaped other than as rectangular blocks and can be round, hectagonal, cylindrical or virtually any other shape.

The squirrel guard includes four corner guards which take the form of transparent guard plates 44. Each guard plate 44 is substantially square and is secured in a horizontal orientation to the bottom edge of each projecting slat end 34a and 36a. The guard plates 44 thus cover the corner areas that are presented in the areas of the adjacent slat ends 34a and 36a, thus preventing squirrels and other animals from obtaining access to the bird feeder by way of these corner areas.

In use of the bird feeder 10, bird seed is loaded through the opening 26 and is funneled onto the platform 18 by panels 28. The bird seed which spills out onto the floor of the bird feeder is readily accessible to birds who may land on the platform 12 or on the slats 36 in order to feed on the bird seed.

Squirrels and other climbing animals that climb the post 14 attempting to reach the bird feeder are unable to do so because of the presence of the squirrel guard. When the squirrel reaches the base of the unit, it must grip one of the blocks 42 with its paw in order to pull itself upwardly onto the platform. However, when the paw is applied to one of the blocks 42, the block rotates and thus does not permit the animal to obtain a grip that is secure enough to allow it to pull itself up onto the bird feeder. As a consequence, the rotatable blocks 42 prevent the squirrel from obtaining access to the bird seed and the animal quickly becomes discouraged and stops trying to reach the bird feeder. The guard plates 44 on the four corners of the squirrel guard prevent the squirrel from climbing onto the feeder through any of the corner areas of the base.

Although the squirrel guard is particularly well suited for use in protecting bird feeders against squirrels and other climbing animals, it also can be used to prevent squirrels, possums, raccoons and other climbing animals from climbing onto protected areas of posts or trees. In this application of the squirrel guard, the squirrel guard is mounted on the post or tree immediately below the location that is to be protected, and it functions in the same manner previously described to thwart animals from attempting to climb above it.

The bird feeder 10 and the squirrel guard may be constructed of wood or any other suitable material. Cedar is an attractive wood that may be used, as may redwood, treated wood or another type of wood. The shafts 38 and 40 may be formed from dowels cut to the appropriate length and glued or otherwise secured to the slat ends 34a and 36a.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for preventing climbing animals from climbing an upright such as a tree or pole, said apparatus comprising:
    a mounting base applicable to the upright;
    means for securing said base to the upright; and
    a plurality of roller elements each mounted on said base for rotation about a substantially horizontal axis, said roller elements cooperating to extend substantially completely around the upright and being rotatable when gripped by an animal on the upright.

2. Apparatus as set forth in claim 1, including a plurality of generally horizontal shafts mounted on said base, said roller elements being mounted side by side on each of said shafts.

3. Apparatus as set forth in claim 2, wherein said shafts are four in number and are arranged in two parallel pairs with the shafts in each pair substantially perpendicular to the shafts in the other pairs.

4. Apparatus as set forth in claim 3, including:
    four corner areas of the base defined adjacent ends of the shafts; and
    a transparent guard plate secured to each corner area in a generally horizontal plane to block access to the base through said corner areas.

5. Apparatus as set forth in claim 1, wherein said base comprises a plurality of slats secured together to form a rigid frame, said roller elements extending in rows located outwardly of and substantially parallel to the respective slats.

6. Apparatus as set forth in claim 5, wherein said slats are four in number and said frame is substantially rectangular.

7. Apparatus as set forth in claim 6, including four shafts mounted on said base outwardly of and substantially parallel to the respective slats, said roller elements being mounted side by side to extend along substantially the entire length of each shaft.

8. An animal guard for preventing squirrels and other animals from reaching an elevated bird feeder, said animal guard comprising:
    a mounting base for application to the bird feeder;
    means for securing said base to the bird feeder; and
    a plurality of roller elements each mounted on said base for rotation about a substantially horizontal axis, said roller elements cooperating to extend substantially continuously and completely around the base and rotating when gripped by an animal attempting to climb to the bird feeder.

9. An animal guard as set forth in claim 8, including a plurality of generally horizontal shafts mounted on said base, said roller elements being mounted side by side on each of said shafts.

10. An animal guard as set forth in claim 9 wherein said shafts are four in number and are arranged in two parallel pairs with the shafts in each pair substantially perpendicular to the shafts in the other pair.

11. An animal guard as set forth in claim 8, wherein said base comprises a plurality of slats secured together to form a rigid frame, said roller elements extending in rows located outwardly of and substantially parallel to the respective slats.

12. An animal guard as set forth in claim 11, wherein said slats are four in number and said frame is substantially rectangular.

13. An animal guard as set forth in claim 12, including four shafts mounted on said base outwardly of and substantially parallel to the respective slats, said roller elements being mounted side by side to extend along substantially the entire length of each shaft.

14. An animal guard as set forth in claim 12,
four corner areas of said base defined adjacent intersections between the slats; and
a transparent guard plate secured to each corner area in a generally horizontal plane to block access to the base through said corner areas.

15. A bird feeder comprising:
a feeder unit for receiving and holding bird seed, said feeder unit having a base by which the feeder unit may be mounted at an elevated position; and
a plurality of roller elements each mounted on said base for rotation about a substantially horizontal axis, said roller elements being located generally side by side and extending substantially continuously and completely around said base and being rotated when gripped by an animal attempting to reach the feeder unit, thereby discouraging the animal from climbing onto the feeder unit.

16. The bird feeder of claim 15, wherein said base includes a generally horizontal platform and a plurality of slats secured to said platform.

17. The bird feeder of claim 16, wherein said slats are secured together in a substantially rectangular configuration.

18. The bird feeder of claim 17, including:
projecting opposite ends of each slat; and
a plurality of shafts extending between said projecting ends of the slats to mount the shafts outwardly of and substantially parallel to the respective slats, said roller elements being mounted for rotation on all of the shafts and being arranged side by side thereon to extend along substantially the entire length of each shaft.

19. The bird feeder of claim 15, including a plurality of generally horizontal shafts mounted on said base, said roller elements being mounted side by side on each of said shafts.

20. The bird feeder of claim 19, wherein said shafts are four in number and are arranged in two parallel pairs with the shafts in each pair substantially perpendicular to the shafts in the other pair.

* * * * *